(No Model.)
W. E. COLE.
FISH TRAP OR NET.
No. 513,483. Patented Jan. 30, 1894.
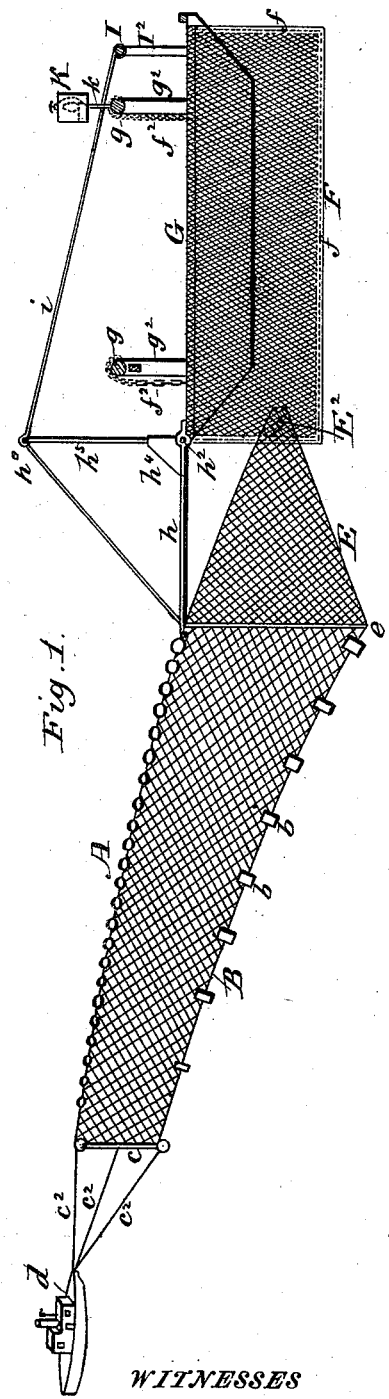
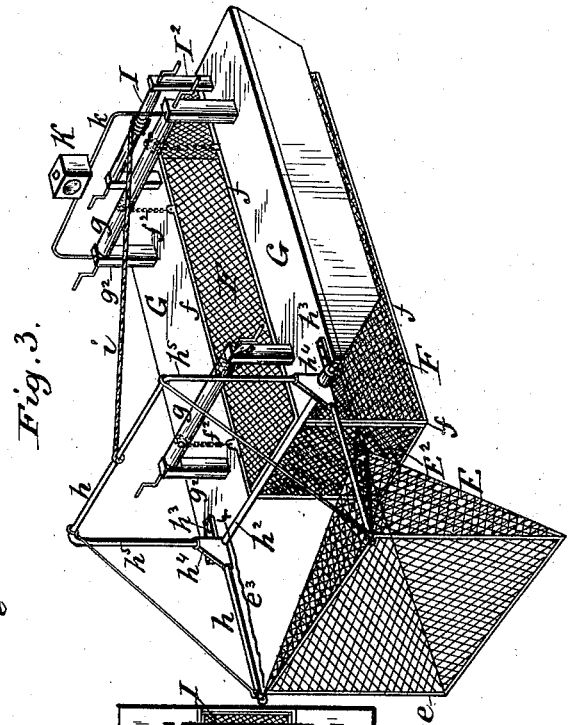
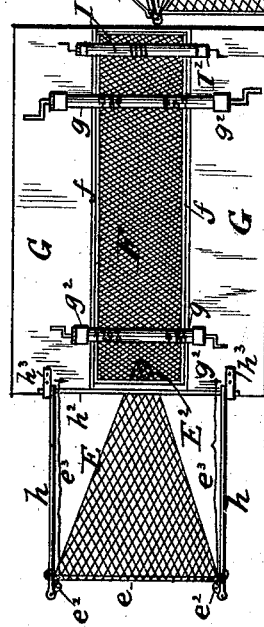
WITNESSES
A. B. Degges
L. D. Heinrichs
INVENTOR
William E. Cole,
by E. E. Masson, Attorney.

UNITED STATES PATENT OFFICE.

WILLIAM E. COLE, OF NEW ORLEANS, LOUISIANA.

FISH TRAP OR NET.

SPECIFICATION forming part of Letters Patent No. 513,483, dated January 30, 1894.

Application filed April 22, 1893. Serial No. 471,456. (No model.)

*To all whom it may concern:*

Be it known that I, WILLIAM E. COLE, a citizen of the United States, residing at New Orleans, in the parish of Orleans, State of Louisiana, have invented certain new and useful Improvements in Fish Traps or Nets, of which the following is a specification, reference being had therein to the accompanying drawings.

The object of my invention is to construct in connection with a seine or net, a floating fish trap which is specially adapted to be used to catch fish continuously both in shoal, or in deep water as at sea, where there is no sensible current, although it can be used with or against the tide, and up and down stream, and the fish be removed therefrom without interrupting the fishing during night and day. I attain this object by the construction illustrated in the accompanying drawings in which—

Figure 1 is a longitudinal vertical section through the middle of the apparatus, constructed in accordance with my invention, said section being through the wire basket or pond-trap of the apparatus and through the adjustable funnel thereof, one of the leading seines attached to said funnel being shown in perspective. Fig. 2 is a top view of the apparatus. Fig. 3 is a perspective view of the apparatus.

In said drawings A represents the cork or float line to which the floats for suspending the leading-in seine are attached, and B the bottom line of said seine having the weights $b$ attached thereto. The front end of the lines A and B are secured to an upright pole $c$, that keeps them apart, and to said pole are secured three lines $c^2$, the opposite ends of which are secured to two tug-boats $d$ or other propeller for dragging the seines and the whole apparatus through the water. The rear end of each seine is secured to the sides of a rectangular frame $e$ that forms the front end of a funnel E. Said funnel consists preferably of cord-netting having tapering sides that converge toward and have their rear ends secured to the periphery of a small funnel $E^2$ of wire, that is secured to the front end of a large basket or trap F, and enters a short distance therein. The small end of the funnel $E^2$ is of sufficient size to admit at the same moment two or three of the fishes operated upon. The basket or trap F is an open-top rectangular trough of wire netting having its edge secured to a rectangular frame $f$ of wood or metal. Said frame and basket is suspended by means of chains $f^2$ from windlasses $g$ that are mounted on posts $g^2$ projecting from the deck of twin boats G. Said windlasses and connected posts serving also, at least in part, to unite one boat to the other. The boats shown are, as preferred, of the kind called flat boats, and may be of any desired size, for example twenty feet long, four feet wide and three feet deep, and kept about four feet apart. The basket between them in this case may be nearly twenty feet long, four feet wide and six feet deep and hold five thousand pounds of fish. The windlasses upon their posts permit the upper part of the basket to be lifted on a higher level than the decks of the boats, so that the bottom of said basket will not hang below the bottom of said boats, and thus be guarded against injury when the apparatus is transported or used in shallow water. To permit the front of the funnel E to be also adjusted for fishing at more or less depth below the surface of the water, the rectangular front frame $e$ thereof has rings supported upon booms $h$, and by means of pulley blocks $e^2$ fastened to the ends of said boom and ropes $e^3$ having one end secured to the frame $e$ and passed around said pulleys, and having the other end secured to the boats G. Said frame is adjustably retained connected to the booms. Said booms $h$ consist preferably of metal rods, that are connected together at their rear ends by means of a rod $h^2$ that extends from one boat to the other and constitutes the hinge rod for said booms. The ends of the rod $h^2$ are received in bearings $h^3$ secured to the extreme front end of the deck of each boat, so that the front ends of the booms can be made to dip below the level of the deck without interfering with the latter. To facilitate the raising and lowering of the booms, the heel of each one is connected by means of a socket plate or brace $h^4$ with a rod $h^5$ set substantially at right angle with the boom, and forming therewith a "bell-crank" the ends of which are connected together by a light rod $h^6$.

To permit the two bell-cranks to be operated together, the upper ends of their standing arms or rods $h^5$ are united together by the rod $h^6$, to the center of which is attached one end of a rope $i$ the opposite end of which is wound upon a windlass I mounted on posts $I^2$ standing upon the stern of each boat. By this construction the front end of the funnel E can not only be adjusted as to depth in fishing, but can be elevated and swung partly inboard over the deck of the boats while they are taken to the fishing grounds.

To attract the fishes while fishing at night, a bright light is produced in a lantern K, similar to a locomotive headlight, or by an electric light, placed over the rear portion of the fish retaining trap or basket. Said light or lantern is mounted upon the middle portion of a rod $k$ suitably bent and having its ends secured to the posts $g^2$ of the rear windlass. After the fishes are received in the basket, they are dipped therefrom once or twice a day without interrupting the fishing, by means of dip-nets introduced among them through the open top of the basket and transferred alive to the deck of a sloop or other boat temporarily moored along side of one of the boats G, from which the small fry or useless fish can be immediately slid back into the sea, and thus obviate the wanton destruction of fishes that may become marketable in the future.

Having now fully described my invention, I claim—

1. In a fishing apparatus, the combination of two boats parallel with each other and secured together, an open top wire basket adjustably suspended between said boats, and having a wire funnel $E^2$ in its front end, a larger funnel E having its rear end secured to the funnel $E^2$ and a rectangular frame in its front end, booms pivoted to the front end of the parallel boats and adjustably supporting the front end of the funnel E, and means to retain and elevate said booms substantially as described, with seines having one end secured to the front frame of the funnel E, and means to pull on said seines and the whole apparatus substantially as described.

2. In a fishing apparatus the combination of two boats, a wire basket adjustably suspended between said boats and having a funnel $E^2$ in its front end, a funnel E having its rear end secured to the funnel $E^2$, bell-crank-lever booms adjustably supporting the front end of the funnel E and pivoted to the front end of the two boats, and a cord secured to said levers, whereby the funnel E is adapted to be swung upward and over the hinge-rod of said levers, substantially as described.

3. In a fishing apparatus the combination of two boats, a netted basket adjustably suspended between said boats and having a funnel $E^2$ in its front end, a funnel E having its rear end secured to the funnel $E^2$, pivoted booms supporting the front end rings of the funnel E, pulley blocks secured to the front ends of the booms and tackle secured to the front end of the funnel and passed through the pulley blocks substantially as described.

4. In a fishing apparatus the combination of two boats, a netted basket adjustably suspended between them and a funnel adjustably suspended in front of the basket, pivoted booms supporting the rectangular front frame of said funnel, and a lantern supported above the netted basket, whereby fishes are attracted and directed toward and into the funnel and netted basket by the light within said lantern substantially as described In testimony whereof I affix my signature in presence of two witnesses.

WILLIAM E. COLE.

Witnesses:
   E. E. MASSON,
   A. B. DEGGES.